(12) United States Patent
Ishida

(10) Patent No.: US 8,461,828 B2
(45) Date of Patent: Jun. 11, 2013

(54) WHEEL SPEED DETECTING DEVICE

(75) Inventor: Shinichiro Ishida, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 318 days.

(21) Appl. No.: 13/020,480

(22) Filed: Feb. 3, 2011

(65) Prior Publication Data

US 2011/0210719 A1 Sep. 1, 2011

(30) Foreign Application Priority Data

Feb. 26, 2010 (JP) ................................ 2010-042429

(51) Int. Cl.
*G01P 3/48* (2006.01)
*G01B 7/30* (2006.01)

(52) U.S. Cl.
USPC ..................................... 324/174; 324/207.25

(58) Field of Classification Search
USPC ..................................... 324/173–174, 207.25
See application file for complete search history.

(56) References Cited

U.S. PATENT DOCUMENTS

| 7,237,960 B2 * | 7/2007 | Oohira et al. ................. 384/448 |
| 7,374,343 B2 * | 5/2008 | Nakajima et al. ............. 384/448 |
| 2009/0038414 A1 * | 2/2009 | Ozaki et al. ............... 73/862.381 |

FOREIGN PATENT DOCUMENTS

| JP | 2006-103372 A | 4/2006 |
| JP | 2009-97997 A | 5/2009 |

\* cited by examiner

*Primary Examiner* — Bot Ledynh

(74) *Attorney, Agent, or Firm* — Birch, Stewart, Kolasch & Birch, LLP

(57) ABSTRACT

A wheel speed detecting device includes a countermeasure against the entrance of muddy water. An annular recess groove is provided in an outer circumference of an end portion of a hub on a sensor side. A cup-shaped flange portion extends from the sensor supporting member with the flange portion covering the annular recess groove while maintaining a predetermined gap T1 between the flange portion and the outer circumference of the end portion of the hub. Muddy water heads toward a multi-pole magnet ring by running through the gap T1 formed between the flange portion and the outer circumference of the hub. However, the entrance of muddy water can be effectively prevented by making the gap T1 small. Thus, muddy water that enters the gap T1 is trapped in the annular recess groove.

20 Claims, 10 Drawing Sheets

WHEEL SPEED DETECTING DEVICE

CROSS-REFERENCE TO RELATED APPLICATIONS

The present application claims priority under 35 USC 119 to Japanese Patent Application No. 2010-042429 filed on Feb. 26, 2010 the entire contents of which are hereby incorporated by reference.

BACKGROUND OF THE INVENTION

1. Field of the Invention

The present invention relates to a wheel speed detecting device including a multi-pole magnet ring and a sensor.

2. Description of Background Art

A technique is known in which a pulsar ring is operatively connected to a wheel of a motorcycle, a detection sensor is operatively connected to a brake caliper, and a wheel speed is obtained from pulse information acquired from the pulsar ring by using the detection sensor. See, for example, FIG. 3 of Japanese Patent Application Publication No. 2006-103372.

More specifically, FIG. 3 of Japanese Patent Application Publication No. 2006-103372 illustrates the pulsar ring (32) (the number in parenthesis indicates a reference numeral described in the patent document. The same applies below) the sensor (33), and the brake caliper (31).

The pulsar ring (32) is a ring with a relatively large diameter. A technique is known in which energy loss is reduced by reducing the moment of inertia. In view of this technique, it is desirable to reduce the diameter of the pulsar ring (32).

A magnetic encoder with a reduced diameter has been proposed. See, for example, FIG. 1 of Japanese Patent Application Publication No. 2009-97997.

As shown in FIG. 1 of Japanese Patent Application Publication No. 2009-97997, a slinger (24) having a L-shaped cross section is attached to an inner ring (13) being a rotating body, and a multi-pole magnet (23) is attached to an outer side surface of the slinger (24). A movement of this multi-pole magnet (23) is detected by a rotation sensor (22) and thereby the rotation speed of the inner ring (13) can be determined.

More specifically, a wheel speed can be detected by disposing a rolling bearing (11) between an axle and a wheel of a motorcycle.

Moreover, since the multi-pole magnet (23) has a sufficiently small diameter, energy loss can be reduced.

However, in a vehicle, especially in a motorcycle, part of the muddy water splashed by a wheel sometimes enters a space between the multi-pole magnet (23) and a detecting portion (25) in FIG. 1 of Japanese Patent Application Publication No. 2009-97997. The muddy water includes various kinds of foreign objects, and the foreign objects may include iron powder which affects magnetic property.

The iron powder adheres onto the multi-pole magnet (23) by magnetic force. Thus, a countermeasure for the adhesion is demanded.

Moreover, as shown in FIG. 1 of Japanese Patent Application Publication No. 2009-97997, the rotation sensor (22) disposed outside the rolling bearing (11) is in a so-called exposed state. Thus, there is room for improvement in terms of external appearance. In addition, the rotation sensor (22) has to be supported by an unillustrated sensor stay. Here, it is inevitable for a rotation detecting device (21) including the sensor stay, the rotation sensor (22), and the multi-pole magnet (23) to become large in size. The rotation detecting device (21) is desired to have a reduced size when considered to be mounted on a motorcycle.

SUMMARY AND OBJECTS OF THE INVENTION

An object of an embodiment of the present invention is to provide a wheel speed detecting device which is small in size and is provided with a countermeasure against the entrance of muddy water including iron powder.

According to an embodiment of the present invention, a wheel speed detecting device in which a multi-pole magnet ring is operatively connected to a bearing fitted into a hub of a wheel, and a sensor is operatively connected to a swing arm or a front fork via a sensor supporting member at a portion facing the multi-pole magnet ring. The wheel speed detecting device detects the multi-pole magnet ring, which rotates together with the wheel, by using the sensor, and thereby detects a rotational speed of the wheel from the detection information obtained by the sensor. In the speed detecting device, an annular recess groove is provided in an outer circumference of an end portion of the hub on a side closer to the sensor, and a cup-shaped flange portion extends from the sensor supporting member, the flange portion covers the annular recess groove while maintaining a predetermined gap between the flange portion and the outer circumference of the end portion of the hub.

According to an embodiment of the present invention, a plurality of the annular recess grooves are provided to be arranged in a longitudinal direction of an axle supporting the wheel.

According to an embodiment of the present invention, an outer diameter of the flange portion is set to be the same as an outer diameter of the hub.

According to an embodiment of the present invention, the flange portion is detachably attached to the sensor supporting member.

According to an embodiment of the present invention, an inner diameter of a tip end of the flange portion is set to be smaller than an outer diameter of the hub.

According to an embodiment of the present invention, the outer circumference of the end portion of the hub is covered with the cup-shaped flange portion. Muddy water heads toward a multi-pole magnetic ring by running through the gap formed between the flange portion and the outer circumference of the hub. However, the entrance of muddy water can be effectively prevented by making the gap small. Muddy water still entering the gap is accumulated in the annular recess groove.

A synergy effect of the cup-shaped flange portion and the annular recess groove allows the wheel speed detecting device to be provided with a countermeasure against entrance of muddy water including iron powder.

Moreover, the sensor supporting member holding the sensor at the portion facing the multi-pole magnet ring is inevitably a ring-shaped member or a cylindrical member. A ring-shaped member or a cylindrical member can be fitted onto the axle. A vehicle speed detecting device including such sensor supporting member, sensor, and multi-pole magnet ring can achieve a reduction in the overall size and improvement in the external appearance.

According to an embodiment of the present invention, the plurality of the annular recess grooves are provided to be arranged in the longitudinal direction of the axle supporting the wheel. Thus, muddy water having entered the gap can be more securely blocked.

According to an embodiment of the present invention, the outer diameter of the flange portion is set to be the same as the outer diameter of the hub. Thus, a new labyrinth portion is formed by the tip end surface of the flange portion and the step portion of the hub, thereby effectively suppressing the entrance of muddy water.

According to an embodiment of the present invention, the flange portion is detachably attached to the sensor supporting member. Thus, if the outer diameter of the hub is changed, the flange portion can be replaced with a flange portion of a different size. In other words, the wheel speed detecting device can be applied to various types of vehicles, and the versatility of the wheel speed detecting device is improved.

According to an embodiment of the present invention, the inner diameter of the tip end of the flange portion is set to be smaller than the outer diameter of the hub. Thus, the countermeasure against entrance of muddy water can be further improved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Embodiments of the present invention will be described below on the basis of the attached drawings.

Figure 1:
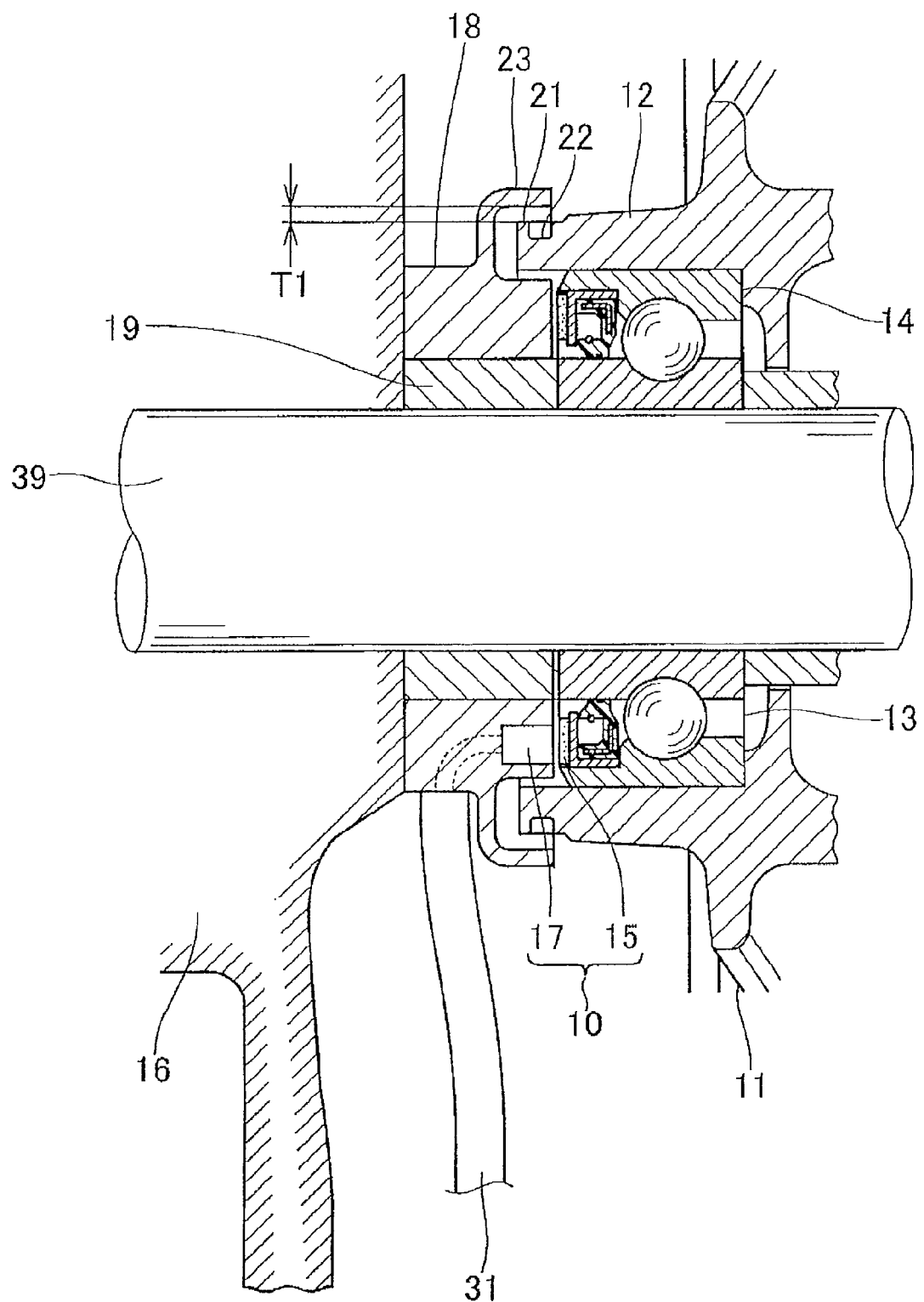
FIG. 1 illustrates a main portion of a motorcycle including a wheel speed detecting device according to the present invention.

FIG. 1 is a view illustrating a main portion of a motorcycle including a wheel speed detecting device according to the present invention. As shown in FIG. 1, a bearing 13 is fitted to a hub 12 of a rear wheel 11. A multi-pole magnet ring 15 is provided to an outer ring 14 of this bearing 13. At a portion facing the multi-pole magnet ring 15, a sensor 17 is disposed between a swing arm 16 and the hub 12.

More specifically, a donut-shaped sensor supporting member 18 is brought into contact with the swing arm 16. A collar 19 is press fitted into the sensor supporting member 18. The collar 19 is press fitted in a manner that its one end portion on the bearing 13 side protrudes from the sensor supporting member 18. It is acceptable that the collar 19 and the sensor supporting member 18 are integrated to each other and formed as a single component by reducing the inner diameter of the sensor supporting member 18. However, in a case where there is a need to use a different material for each component, such as in a case where wear resistant steel is used for the collar 19 and soft steel for the sensor supporting member 18, the collar 19 is press fitted as in this embodiment.

One or multiple sensors 17 are buried into such sensor supporting member 18.

Part of the sensor supporting member 18 is inserted into the hub 12. In other words, an outer end surface of the bearing 13 is displaced beyond an end surface of the hub 12 on the swing arm 16 side (or, buried). As a result, a later-described labyrinth structure is formed.

An annular recess groove 22 is provided in an outer circumference 21 of an end portion of the hub 12 on the sensor 17 side. In addition, a cup-shaped flange portion 23 covering the annular recess groove 22 while maintaining a predetermined gap T1 between the flange portion 23 and the outer circumference 21 of the end portion of the hub 12 extends from the sensor supporting member 18 in a direction away from the swing arm 16.

An example of a structure of the bearing 13 will be described by the following drawings.

Figure 2:
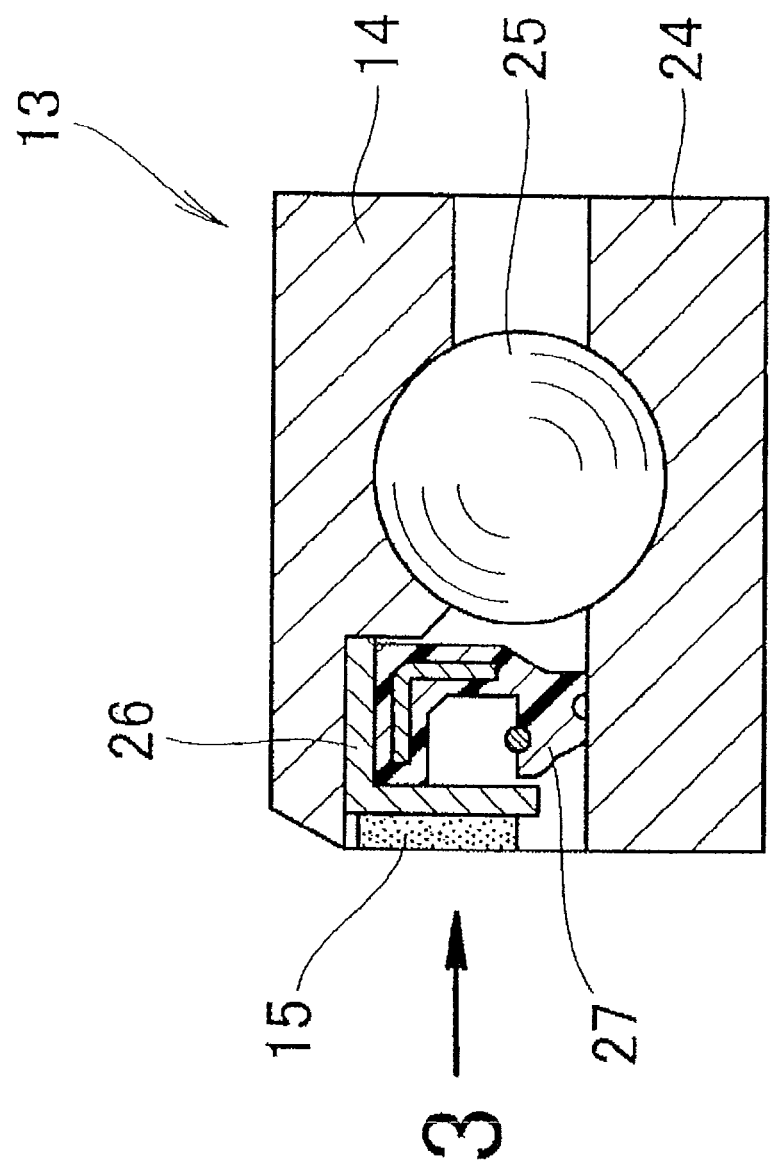
FIG. 2 is a cross-sectional view of a bearing.

As shown in FIG. 2, the bearing 13 includes an inner ring 24, balls 25, and the outer ring 14. A ring fitting 26 having an L-shaped cross section is fitted to the outer ring 14. Note that, a sealing member 27 such as an oil seal is attached to the inside of the ring fitting 26, and the multi-pole magnet ring 15 is attached to the outside of the ring fitting 26 in advance. The sealing member 27 can block dust and water flying toward the balls 25.

Figure 3:
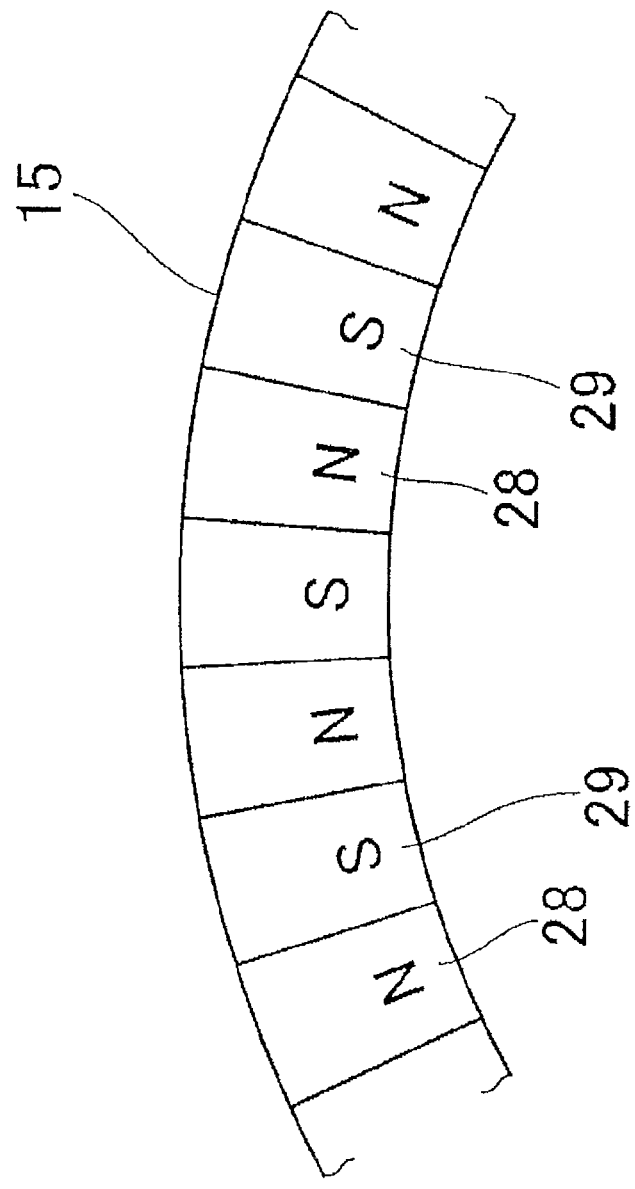
FIG. 3 is a view seen in a direction of an arrow 3 in FIG. 2.

As shown in FIG. 3, the multi-pole magnet ring 15 is a special magnet in which north pole portions 28 and south pole portions 29 are arranged alternately.

Thus, in FIG. 1, the rotation speed of the multi-pole magnet ring 15 can be detected by detecting pole changes of the multi-pole magnet ring 15 with the sensor 17. Detection information is sent out through a harness 31. Since the multi-pole magnet ring 15 rotates together with the wheel, a wheel speed (rotation speed of the wheel) can be detected from the detection information.

In other words, the wheel speed detecting device 10 includes the multi-pole magnet ring 15 attached to the hub 12 being a rotating body and the sensor 17 attached to the swing arm 16 being a non-rotating body.

An operation of the wheel speed detecting device 10 having the above configuration will be described next.

Figure 4:
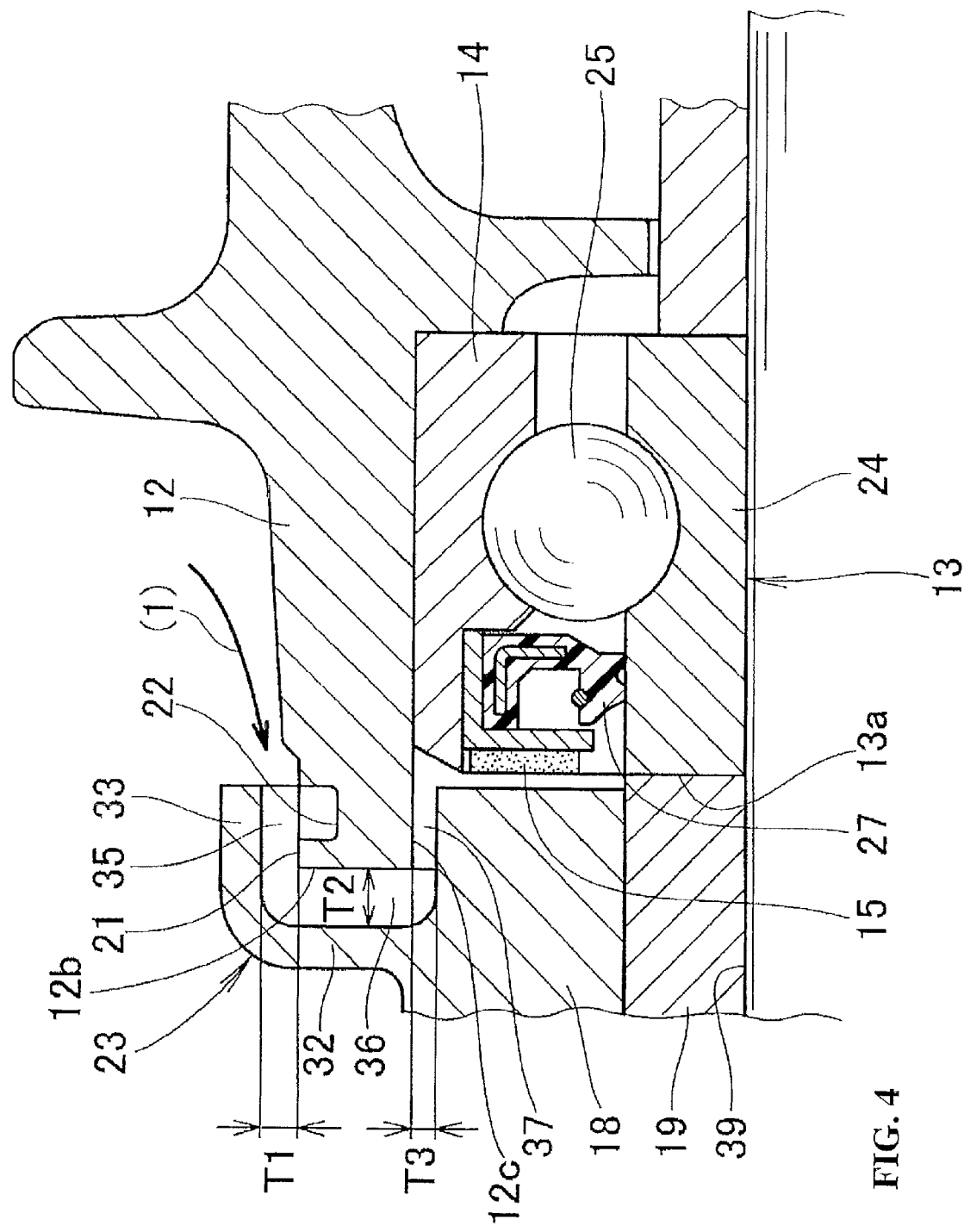
FIG. 4 is a cross-sectional view of a main portion of the present invention.

As shown in FIG. 4, the cup-shaped flange portion 23 covering the annular recess groove 22 while maintaining the predetermined gap T1 between the flange portion 23 and the outer circumference 21 of the end portion of the hub 12 extends from the sensor supporting member 18.

More specifically, the cup-shaped flange portion 23 includes a disk portion 32 extending radially outwardly from the sensor supporting member 18 and a cylinder portion 33 extending parallel to the outer circumference 21 of the hub 12 from an outer circumference of the disk portion 32.

The disk portion 32 may be a conical plate instead of a disk.

A gap between the outer circumference 21 of the hub 12 and the cylinder portion 33 is T1. Moreover, a gap between a tip end surface 12b of the hub 12 and the disk portion 32 is T2, and a gap between an inner circumference 12c of the hub 12 and an outer circumference of a tip end of the sensor supporting member 18 is T3. The gap T3 is formed as follows. The outer end surface 13a of the bearing 13 is displaced beyond the tip end surface 12b of the hub 12 on the swing arm 16 side, thereby inserting part of the sensor supporting member 18 into the hub 12. Note that, each of the gaps T1 to T3 is set to be as small as possible within a range in which the components do not come into contact with each other while considering the expansion, vibration, and the like of the components.

As indicated by an arrow (1), muddy water entering from the outside reaches the multi-pole magnet ring 15 after passing through the labyrinth structure including a gap portion 35 with the gap T1, a gap portion 36 with the gap T2, and a gap portion 37 with the gap T3. However, the labyrinth structure is formed by arranging the gap portions 35 to 37 in a squared U-shape and the gaps T1 to T3 are sufficiently small. Thus, the labyrinth structure has a large flow resistance, and it is hard for muddy water to enter the structure.

Even if muddy water enters the gap portion 35 with the gap T1, the muddy water is trapped by the annular recess groove 22. Thus, entrance of muddy water is prevented and there is no concern of muddy water reaching the multi-pole magnet ring 15.

Modifications of the embodiment shown in FIG. 4 will be described based on FIGS. 5 to 9.

Figure 5:
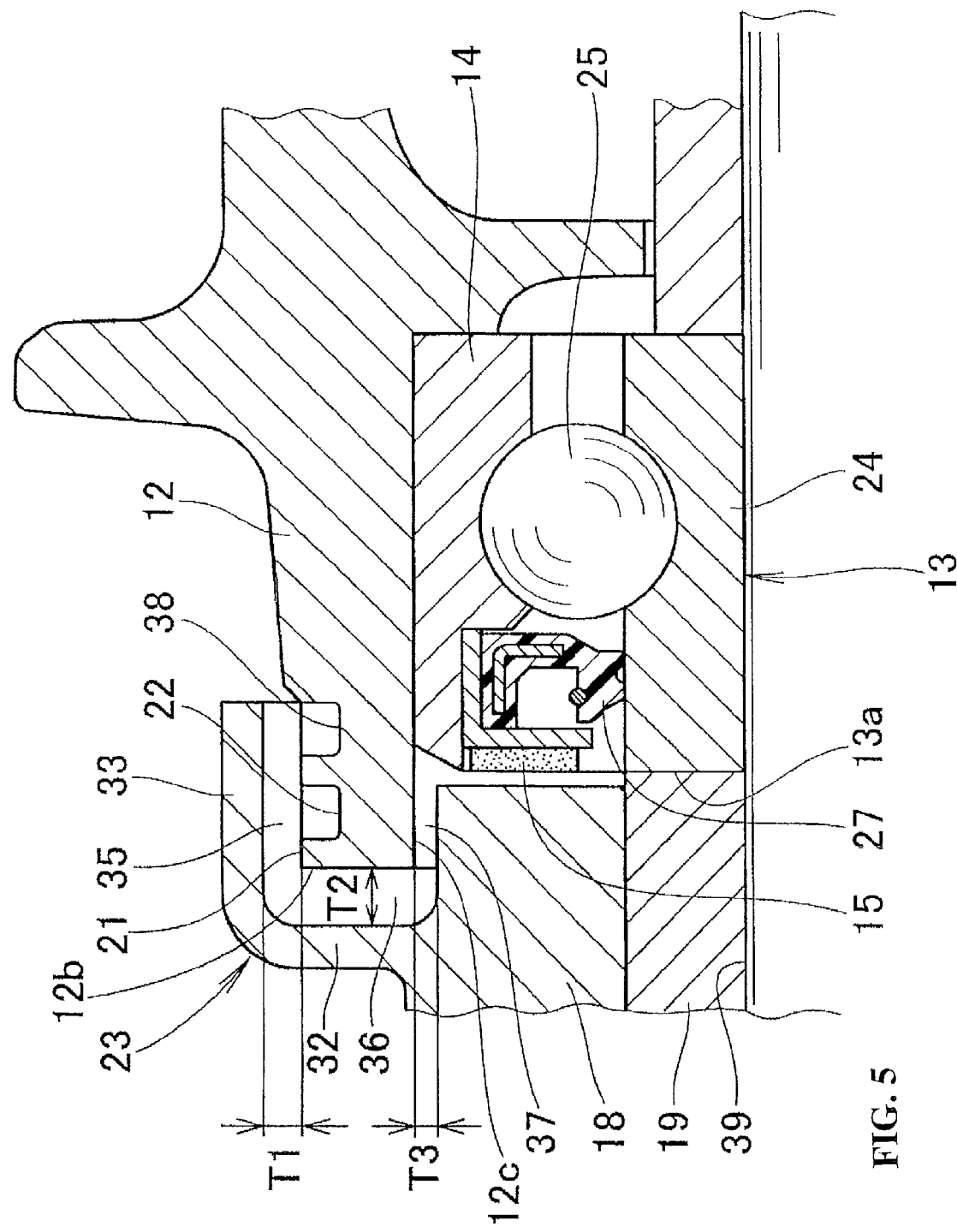
FIG. 5 is a cross-sectional view of a main portion of the present invention.

As shown in FIG. 5, FIG. 5 is different from FIG. 4 in that two annular recess grooves 22, 38 are provided in the outer circumference 21 of the hub 12, the grooves 22, 38 arranged in a longitudinal direction of an axle 39 of the rear wheel, and the cylinder portion 33 extends to cover all of the two annular recess grooves 22, 38. Since other configurations are the same as those of FIG. 4, the same reference numerals as in FIG. 4 are used, and descriptions thereof are omitted.

If the annular recess groove 38 is filled with muddy water, the next annular recess groove 22 traps muddy water. Thus, blocking performance of muddy water is improved. Three or more annular recess grooves 22 may be provided.

Figure 6:
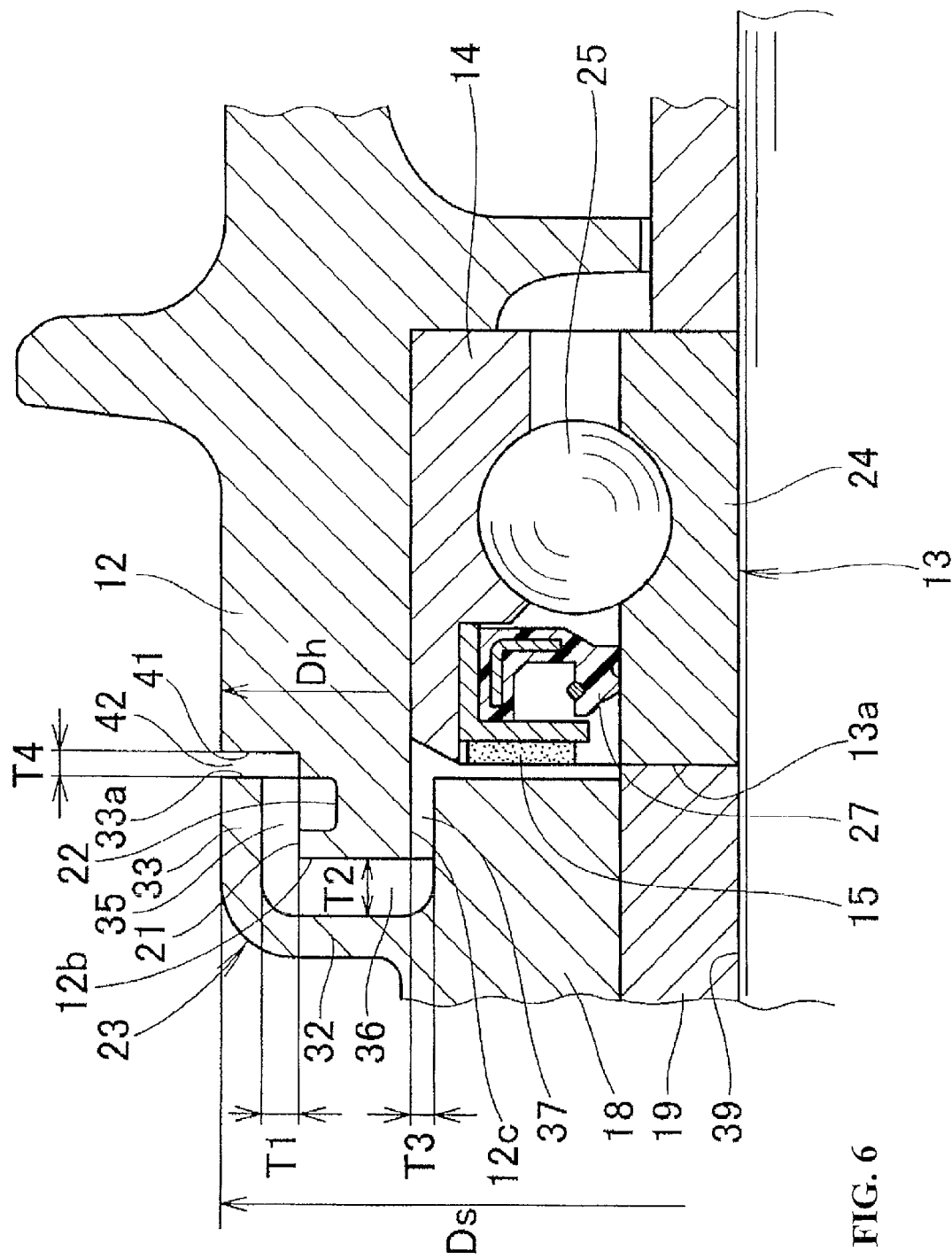
FIG. 6 is a cross-sectional view of a main portion of the present invention.

As shown in FIG. 6, FIG. 6 is different from FIG. 4 in that an outer diameter Dh of the hub 12 and an outer diameter Ds of the cylinder portion 33 are the same. Since other configurations are the same as those of FIG. 4, the same reference numerals as in FIG. 4 are used, and descriptions thereof are omitted.

If a gap between a step portion (wall portion) 41 of the hub 12 and a tip end 33a of the cylinder portion 33 is T4, the labyrinth structure includes the gap portion 35 with the gap T1, the gap portion 36 with the gap T2, the gap portion 37 with the gap T3, and a gap portion 42 with the gap T4. Thus, the flow resistance increases, and the blocking performance of muddy water is further improved.

Figure 7:
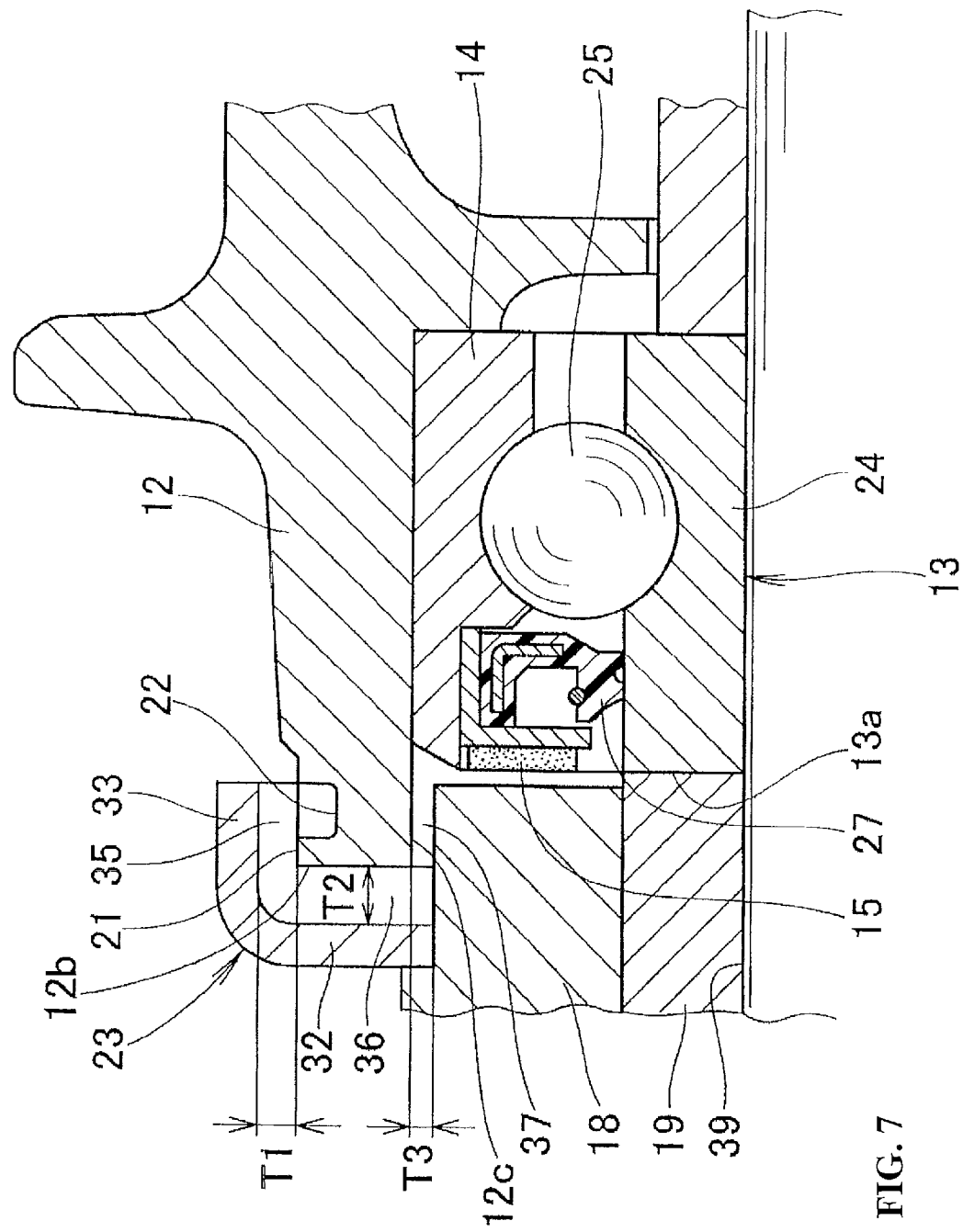
FIG. 7 is a cross-sectional view of a main portion of the present invention.

As shown in FIG. 7, FIG. 7 is different from FIG. 4 in that the flange 23 is detachably attached to the sensor supporting member 18. Since other configurations are the same as those of FIG. 4, the same reference numerals as in FIG. 4 are used, and descriptions thereof are omitted.

The flange portion 23 is press fitted to the sensor supporting member 18. Alternatively, the flange portion 23 may be fixed to the sensor supporting member 18 by a screw or adhesive.

If the outer diameter of the hub 12 is changed, the flange portion 23 may be replaced with a flange portion of a different size. In other words, the wheel speed detecting device can be applied to various types of vehicles, and the versatility of the wheel speed detecting device can be improved.

Figure 8:
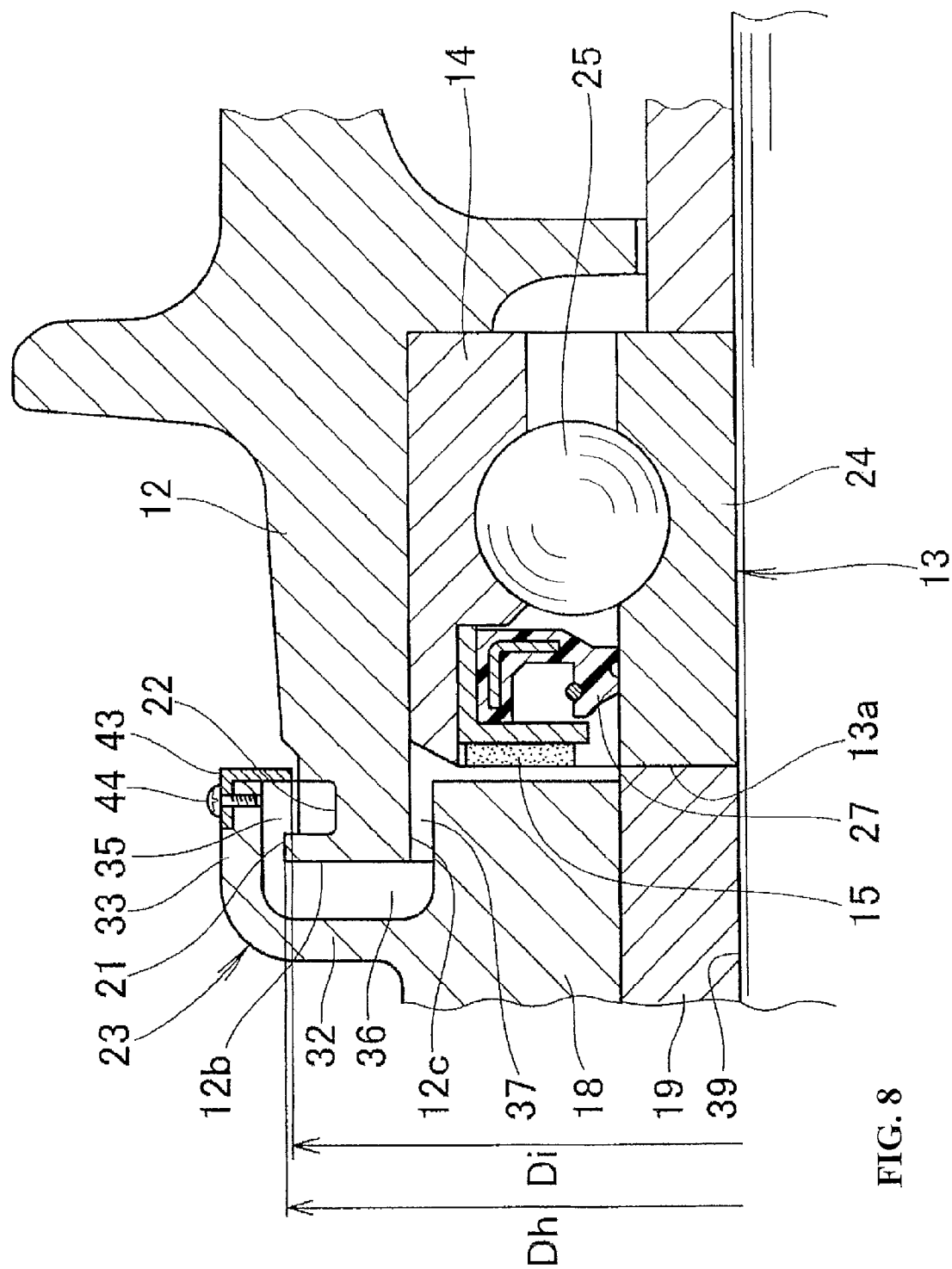
FIG. 8 is a cross-sectional view of a main portion of the present invention.

As shown in FIG. 8, FIG. 8 is different from FIG. 4 in that an inner diameter Di of a tip end of the flange portion 23 is set to be smaller than the outer diameter Dh of the hub 12. Since other configurations are the same as those of FIG. 4, the same reference numerals as in FIG. 4 are used, and descriptions thereof are omitted.

In consideration of the assembly, it is recommended to attach a diameter reduction ring 43 to the cylinder portion 33 by screws 44, the diameter reduction ring 43 having an L-shaped cross section and being a circle divided into two to four parts. When the diameter reduction ring 43 divided into two or three parts is used, the tip end thereof can be inserted into the annular recess groove 22.

Figure 9:
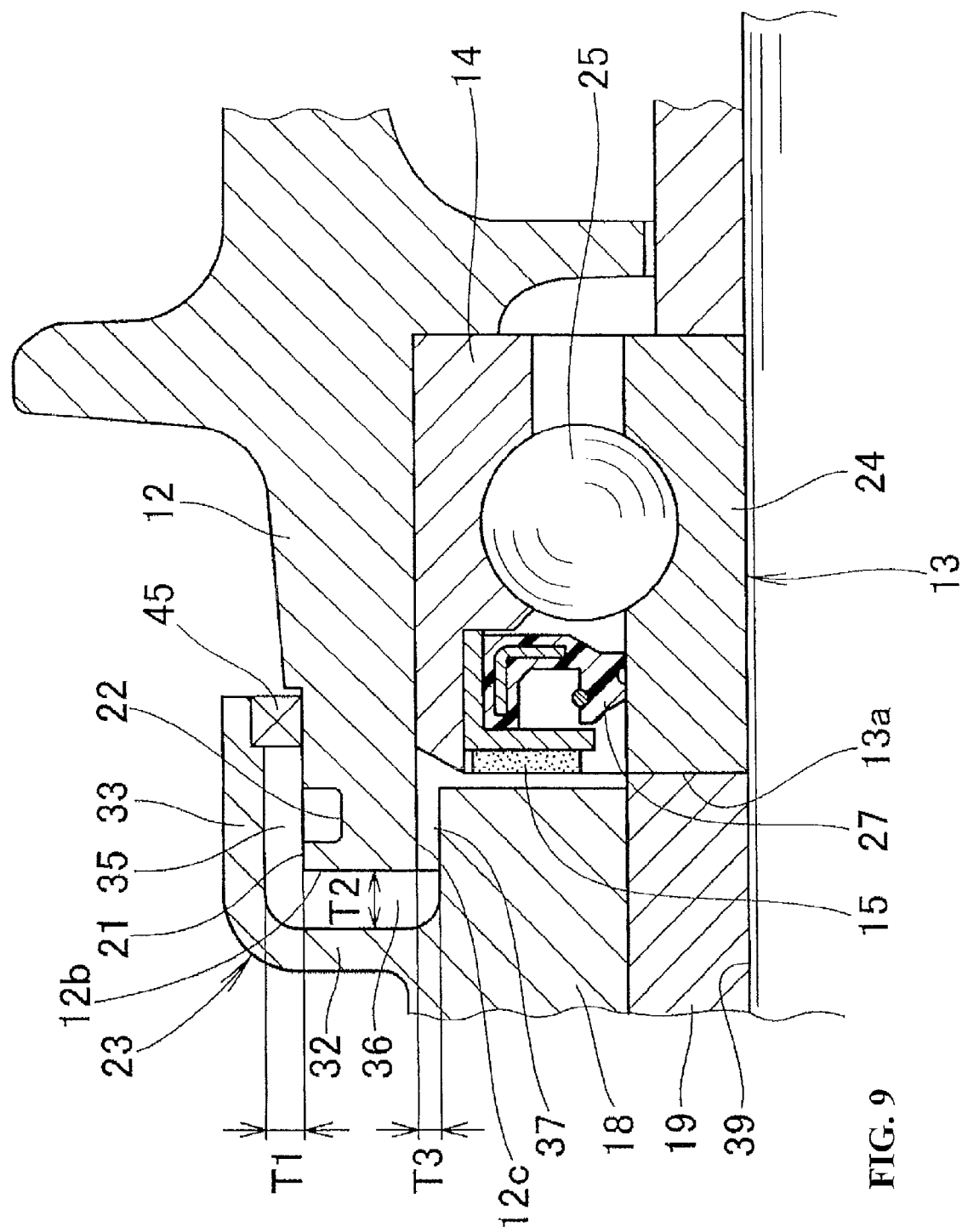
FIG. 9 is a cross-sectional view of a main portion of the present invention.

As shown in FIG. 9, FIG. 9 is different from FIG. 4 in that a sealing member 45 is attached to the tip end of the cylinder portion 33, and that this sealing member 45 is brought into contact with the outer circumference 21 of the hub 12. Since other configurations are the same as those of FIG. 4, the same reference numerals as in FIG. 4 are used, and descriptions thereof are omitted.

A material with low sealing performance such as sponge is used as the sealing member 45. Accordingly, a certain level of air permeability allows hot air due to heat generated in the bearing 13 to be exhausted to the outside.

The countermeasure against the entrance of muddy water can be improved further accordingly by the addition of the sealing member 45.

Figure 10:
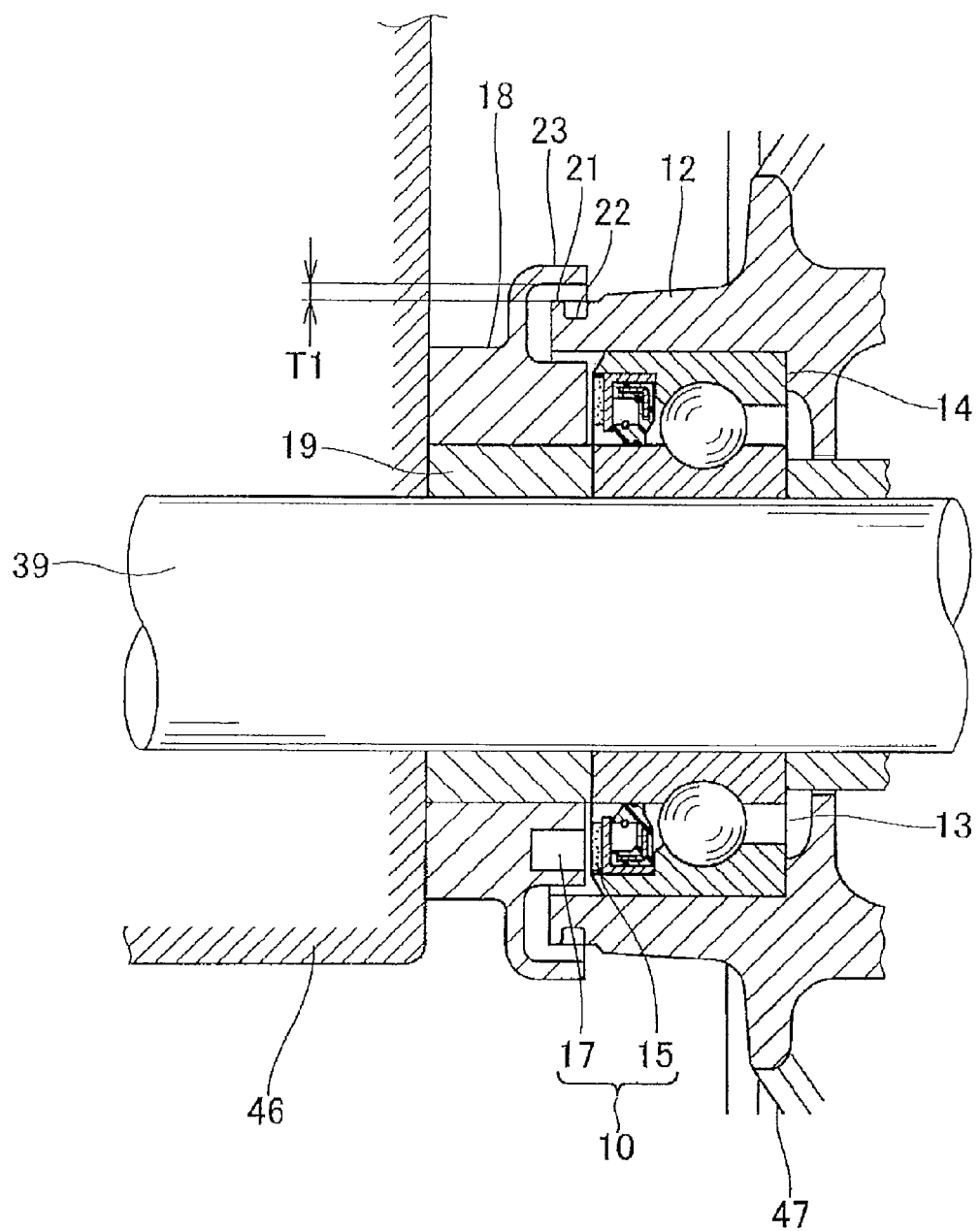
FIG. 10 is an explanation view of a main portion of the present invention.

As shown in FIG. 10, the wheel speed detecting device 10 of the present invention may be provided between a front fork 46 and a hub 12 of a front wheel 47. Since other configurations are the same as those of FIG. 1, the same reference numerals as in FIG. 1 are used, and descriptions thereof are omitted.

Note that, the annular recess groove may have a semi-circular cross section or a U-shaped cross section, instead of a square cross section.

The wheel speed detecting device of the present invention can be applied to a three-wheeled vehicle, a four-wheeled vehicle, and a bicycle which does not have an engine, in addition to a motorcycle.

The wheel speed detecting device of the present invention is suitable for a motorcycle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A wheel speed detecting device comprising:
   a multi-pole magnet ring operatively mounted on a bearing fitted into a hub of a wheel;
   a sensor operatively mounted relative to a swing arm or a front fork via a sensor supporting member at a portion facing the multi-pole magnet ring;
   said wheel speed detecting device detecting the multi-pole magnet ring, which rotates together with the wheel, by using the sensor, and thereby detecting a rotation speed of the wheel from the detection information obtained by the sensor;
   an annular recess groove provided in an outer circumference of an end portion of the hub on a side closer to the sensor; and
   a cup-shaped flange portion extending from the sensor supporting member, the cup-shaped flange portion covering the annular recess groove while maintaining a predetermined gap between the cup-shaped flange portion and the outer circumference of the end portion of the hub,
wherein the cup-shaped flange portion includes a disk portion extending radially outwardly from the sensor supporting member and a cylinder portion extending parallel to the outer circumference of the hub, said cylinder portion extending from an outer circumference of the disk portion.

2. The wheel speed detecting device according to claim 1, wherein a plurality of the annular recess grooves are provided to be arranged in a longitudinal direction of an axle supporting the wheel.

3. The wheel speed detecting device according to claim 1, wherein an outer diameter (Ds) of the cup-shaped flange portion is set to be the same as an outer diameter (Dh) of the hub.

4. The wheel speed detecting device according to claim 1, wherein the cup-shaped flange portion is detachably attached to the sensor supporting member.

5. The wheel speed detecting device according to claim 1, wherein an inner diameter (Di) of a tip end of the cup-shaped flange portion is set to be smaller than an outer diameter (Dh) of the hub.

6. The wheel speed detecting device according to claim 1, and further including a collar, said collar being press fitted into a central portion of the sensor supporting member for mounting the sensor supporting member relative to the swing arm or front fork.

7. The wheel speed detecting device according to claim 1, wherein said disk portion is a conical plate.

8. The wheel speed detecting device according to claim 1, wherein another predetermined gap is formed between an inner circumference of the hub and an outer circumference of a tip end of the sensor supporting member.

9. The wheel speed detecting device according to claim 1, and further including a diameter reduction ring operatively mounted to a distal end of the cup-shaped flange portion extending from the sensor supporting member towards the hub, said diameter reduction ring having an L-shaped cross section.

10. A wheel speed detecting device comprising:
a multi-pole magnet ring operatively mounted on a bearing adapted to be fitted into a hub of a wheel;
a sensor adapted to be operatively mounted relative to a support facing the multi-pole magnet ring;
said wheel speed detecting device detecting the rotation of the multi-pole magnet ring by using the sensor, and thereby detecting a rotation speed of the multi-pole magnet ring from the detection information obtained by the sensor;
an annular recess groove provided in an outer circumference of an end portion of the hub on a side closer to the sensor;
a cup-shaped flange portion extending from the sensor supporting member, said cup-shaped flange portion covering the annular recess groove while maintaining a predetermined gap between the cup-shaped flange portion and the outer circumference of the end portion of the hub, and
a collar, said collar being press fitted into a central portion of the sensor supporting member for mounting the sensor supporting member relative to the support.

11. The wheel speed detecting device according to claim 10, wherein a plurality of the annular recess grooves are provided to be arranged in a longitudinal direction of the hub.

12. The wheel speed detecting device according to claim 10, wherein an outer diameter (Ds) of the cup-shaped flange portion is set to be the same as an outer diameter (Dh) of the hub.

13. The wheel speed detecting device according to claim 10, wherein the cup-shaped flange portion is detachably attached to the sensor supporting member.

14. The wheel speed detecting device according to claim 10, wherein an inner diameter (Di) of a tip end of the cup-shaped flange portion is set to be smaller than an outer diameter (Dh) of the hub.

15. The wheel speed detecting device according to claim 10, wherein the cup-shaped flange portion includes a disk portion extending radially outwardly from the sensor supporting member and a cylinder portion extending parallel to the outer circumference of the hub, said cylinder portion extending from an outer circumference of the disk portion.

16. The wheel speed detecting device according to claim 15, wherein said disk portion is a conical plate.

17. The wheel speed detecting device according to claim 10, wherein another predetermined gap is formed between an inner circumference of the hub and an outer circumference of a tip end of the sensor supporting member.

18. The wheel speed detecting device according to claim 10, and further including a diameter reduction ring operatively mounted to a distal end of the cup-shaped flange portion extending from the sensor supporting member towards the hub, said diameter reduction ring having an L-shaped cross section.

19. A wheel speed detecting device comprising:
a multi-pole magnet ring operatively mounted on a bearing fitted into a hub of a wheel;
a sensor operatively mounted relative to a swing arm or a front fork via a sensor supporting member at a portion facing the multi-pole magnet ring;
said wheel speed detecting device detecting the multi-pole magnet ring, which rotates together with the wheel, by using the sensor, and thereby detecting a rotation speed of the wheel from the detection information obtained by the sensor;
an annular recess groove provided in an outer circumference of an end portion of the hub on a side closer to the sensor; and
a cup-shaped flange portion extending from the sensor supporting member, the cup-shaped flange portion covering the annular recess groove while maintaining a predetermined gap between the cup-shaped flange portion and the outer circumference of the end of the hub, wherein a predetermined gap is formed between an inner circumference of the hub and an outer circumference of a tip end of the sensor supporting member,
wherein another predetermined gap is formed between an inner circumference of the hub and an outer circumference of a tip end of the sensor supporting member.

20. The wheel speed detecting device according to claim 19, wherein the cup-shaped flange portion includes a disk portion extending radially outwardly from the sensor supporting member and a cylinder portion extending parallel to the outer circumference of the hub, said cylinder portion extending from an outer circumference of the disk portion.

* * * * *